Sept. 20, 1966      A. R. LARDIN      3,273,459
LAUNCHER FOR STORES
Filed Aug. 31, 1964      4 Sheets-Sheet 3
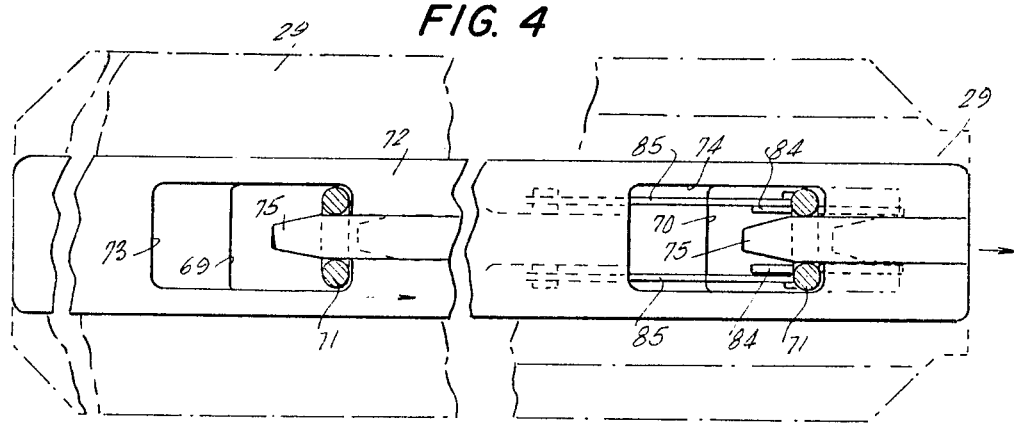
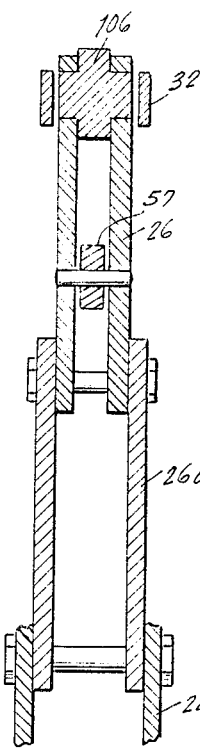
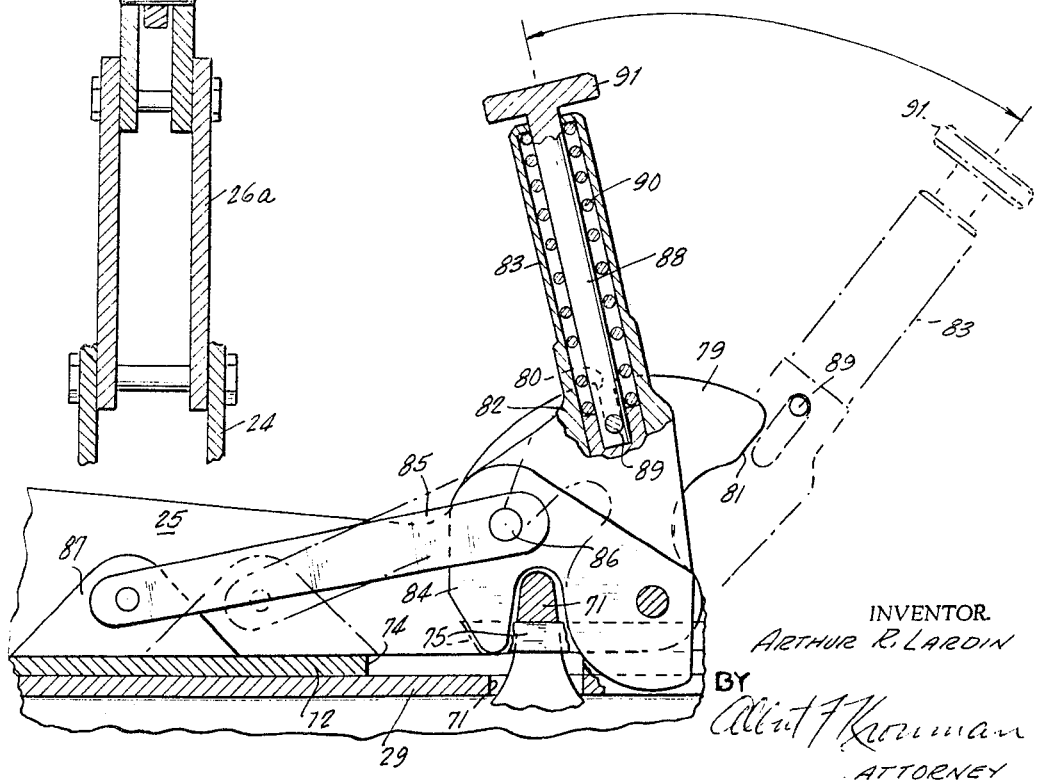
INVENTOR.
ARTHUR R. LARDIN
BY
ATTORNEY Sept. 20, 1966  A. R. LARDIN  3,273,459
LAUNCHER FOR STORES
Filed Aug. 31, 1964  4 Sheets-Sheet 4

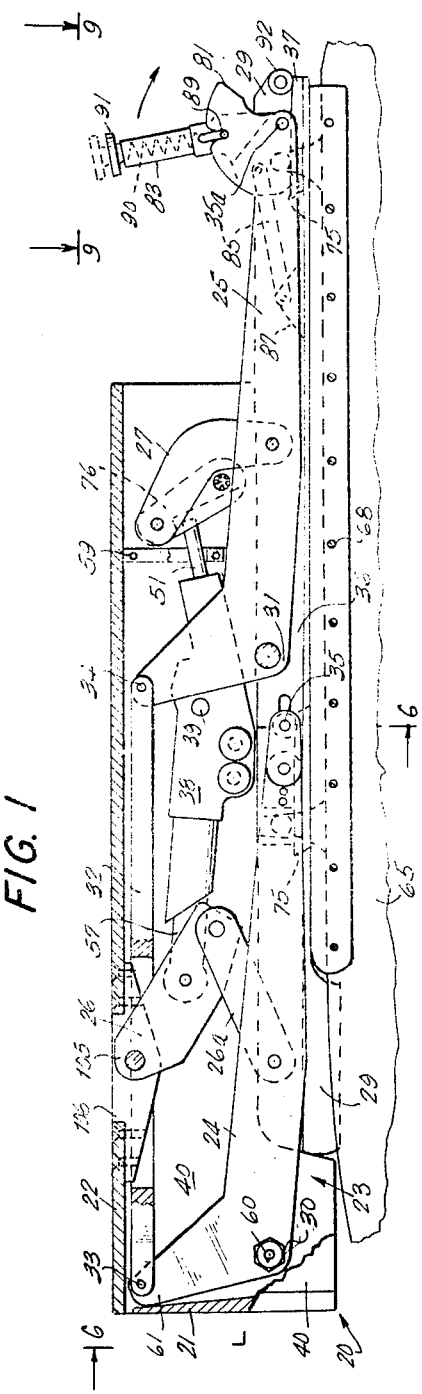

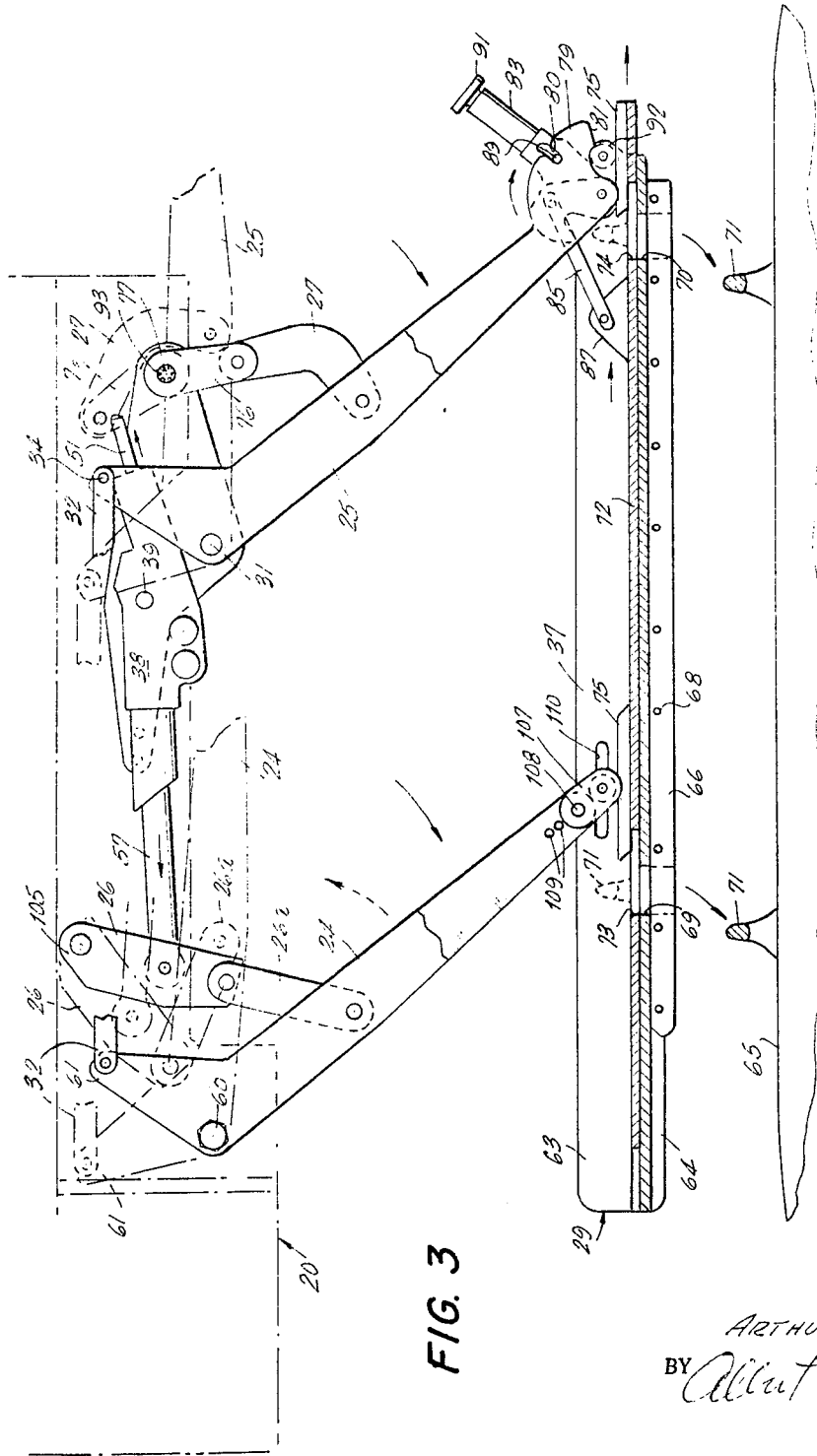

INVENTOR.
ARTHUR R. LARDIN
BY
ATTORNEY

United States Patent Office 3,273,459
Patented Sept. 20, 1966

3,273,459
LAUNCHER FOR STORES
Arthur R. Lardin, Monmouth Mobile Home Park, U.S. Highway 1, Monmouth Junction, N.J.
Filed Aug. 31, 1964, Ser. No. 393,209
11 Claims. (Cl. 89—1.5)

This invention relates to a launcher for missiles or stores which are released from aircraft and more specifically to a launcher for aircraft flying at speeds ranging from the low subsonic through the transonic into the high supersonic.

Present day missiles or stores are often thin skinned, winged objects which must be launched from an aircraft under a wide variety of speeds and flying conditions. In launching such objects it is important to get the missile or store safely away from the aircraft so that it does not subsequently collide with the aircraft or become diverted by reason of the flow of air passing the aircraft. In addition, it is important to launch the missile with sufficient velocity to free itself from the aircraft and its influence while at the same time preventing the missle from being damaged by the launching apparatus.

With present day aircraft, and particularly military aircraft the missles may be launched at speeds varying from the subsonic through transonic and into the high supersonic. In addition, the missles may be launched at elevations in excess of 70,000 feet. Each of these conditions imposes certain forces upon the missile which effect its performance during the launch.

The missile launcher itself, in order to be practical, must in addition to directing the missile provide a minimum amount of drag before and after the release of the missile. There must be an instant and positive retraction of the launcher after a release and the missile or store must be under positive mechanical control of the launcher at all times so that a successful launch can be achieved in the presence of the many forces acting upon the missile.

Since the dynamic pressure upon the missile increases as the square of the velocity ratio the external forces and moments influencing the behavior of the missile during launch and immediately thereafter, may increase fifty times or more during the speed range from the low subsonic to the high supersonic. In addition, the direction and nature of the airflow over and under the wing of an aircraft changes as speed increases and indeed exceeds the sonic, all of which effects the stability of the missile before and after launching from the said aircraft.

A further problem in connection with launching missiles is that the angle which an aircraft assumes with respect to its flight path changes with increases in altitude so that there is an increase of "nose-up" angle as the altitude increases. This angle results in a variable in the angle of attack of the missile at the instant of launch and a variable in the lift and pitching moment of the missile during and immediately after the launch. To be effective the launching device must cancel these forces and change the angle of attack of the missile as it is being launched.

Prior art devices have employed expanding gas motors which apply forces directly to the missiles and often destroy them. In addition, other prior art devices used single mechanisms which provided a mechanical ratio that could not exceed 5 to 1. Previously known launchers also employed springs to retract the launcher with the result that the devices soon became inoperative inasmuch as the acceleration imposed during the launching operation is in excess of the elastic capabilities of the springs.

In an effort to counter-balance the moments about the missile during launching certain other prior art devices have employed sway braces which by imposing localized stress upon the thin skin of the missile often destroyed it. Since many missiles are provided with fuel tanks the rupture of the thin skin often resulted in the breaking up of the said fuel tanks.

Accordingly, it is an object of the present invention to provide a launcher for missiles or stores which will remain operative throughout the flying speed ranges of modern aircraft.

Another object of the present invention is to provide a launcher which will operate at altitudes over 70,000 feet.

Still another object of the present invention is to provide a launcher for missiles or stores which is applicable to any type of aircraft and any type of missile, including winged missiles.

A further object of the present invention is to provide a launcher which will have the minimum of air-drag before and after the release of the missile.

Still another object of the present invention is to provide a launcher for a store or missile which has instant and positive retraction following the launch.

A further object of the present invention is to provide a launcher having the required separation velocity without the usual application of a peak force which may destroy the store.

A feature of the present invention is its compound linkage mechanism whereby the final output force is substantially constant or is an average force.

Another feature of the present invention is its mechanism whereby the return of launcher arms is accomplished by means of the residue gas pressure after launching.

Still another feature of the present invention is its use of elongated flexible missile conforming sway braces to prevent missile damage during launch by spreading the load over a large area of the missile surface and thereby improving launching control.

The invention consists of the construction, combination and arrangement of parts, as herein illustrated, described and claimed.

In the accompanying drawing, forming a part hereof there is illustrated one form of embodiment of the invention, in which drawing similar reference characters designated corresponding parts, and in which:

FIGURE 1 is a view in side elevation of a launcher according to the present invention in the armed or loaded position with certain parts shown in dashed lines, and partially broken away.

FIGURE 2 is a fragmentary view similar to FIGURE 1 somewhat enlarged showing the launcher at the start of the launching operation.

FIGURE 3 is a view similar to FIGURES 1 and 2, showing the launcher at the instant of the launching operation.

FIGURE 4 is a fragmentary top plan view of the missile carrier of the launcher made in accordance with the present invention.

FIGURE 5 is a sectional view taken on line 5—5 in FIGURE 2, looking in the direction of the arrows.

FIGURE 10 is a fragmentary view in side elevation, on an enlarged scale of the missile release and locking mechanism shown in FIGURES 1, 3 and 9.

Figure 6:
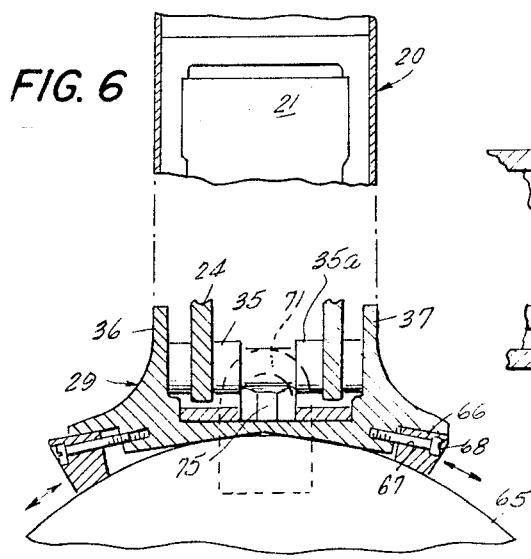
FIGURE 6 is a sectional view taken on line 6—6 in FIGURE 1, looking in the direction of the arrows.

Referring to the drawings and particularly to FIGURES 1, 2 and 3, 20 indicates a channel shaped housing having an end wall 21, and open at its bottom and opposite end. The top wall 22 of the housing is secured to the aircraft (not shown) in any suitable manner. The operating mechanism of the launcher nests within the housing 20 when it is in the armed position and immediately following the launch.

The operating mechanism 23 of the launcher consists, generally, of spaced front launch arms 24, spaced rear launch arms 25, front links connected to the housing 20 and the front launch arms 24, rear links connected to the housing 20 and rear launch arms 25, a gas driven piston 28, and a carriage 29 for the missiles or stores.

As shown in FIGURE 1, the front launch arms 24 and the rear launch arms 25, are modified bell crank levers pivotally secured at their apices 30, 31, to the housing 20. The upper ends of the arms 24, 25, are connected together by means of a link 32 which is pivotally secured thereto at 33, 34. The opposite ends of the arms 24, 25, are attached to flanges 36, 37, which in turn are part of the missile carriage 29 (see FIGURE 6). The arms 24, 25, are coupled to the flanges 36, 37, by means of rollers 35, 35A, journaled therein so that they can rotate with respect to the said flanges.

Power is supplied to the launcher by means of a gas expansion motor 38 carried within the housing 20. The motor 38 is rockably mounted upon a heavy shaft 39, which is carried by the side walls 40, of the housing 20 and which is journaled within the block 41, of the gas expansion motor 38.

The motor 38 as illustrated in FIGURE 2 is provided with two cartridge receiving bores 42, which are connected by a passageway 43. The expanding gases from the cartridges 44 are led by means of a second passageway 45, into a small chamber 46. The chamber 46 is formed in the block 41, of the motor 38 and is provided with a threaded plug 47, which serves to seal the open end thereof. The plug 47 may be removed for the purpose of cleaning the chamber 46 which is designed to receive any of the products of combustion from the cartridges 44, which are not entirely consumed during the firing of the launching device. The expanding gases are led from the chamber 46 into a cylindrical bore 48 in the motor block 41 within which there is slidably carried a piston 49. The end of the bore 48 is closed by a centrally bored plug 50, and the piston 49 is provided with an elongated rod 51, which extends through the plug 50, and beyond the motor block 41. A spring 52 is disposed around the rod 50 between the piston 49 and the plug 50, and urges the piston 49 in the direction of the chamber 46.

As the expanding gases enter the cylinder 48, and drive the piston 49 in the direction of the plug 50 it uncovers a port 53 in the wall of the cylindrical bore 48, through which the expanding gases can travel by way of the passageway 54. The passageway 54 leads into the main cylindrical bore 55 of the gas expansion motor 38. The expanding gases entering the cylindrical bore 55 drive the piston 56 which is slidably carried therein in the direction of the front links 26. The piston 56 is formed with a rod 57, which in turn is rotatably coupled to the front links 26. It will be apparent from an examination of FIGURES 1, 2 and 3, that the spaced front links each comprise a double toggle joint and the rear links 27, 76, form a single toggle joint. The effect of the motion of the piston rod 57 as the gases of the gas motor expand is to drive the front links from the position shown in FIGURE 1, through the position shown in FIGURE 3, and beyond the position shown in FIGURE 3 to the position indicated by the dashed lines in said FIGURE 3. While the double toggle joint represented by the forward links 26 is moving from a position to the right of its center line to a position to the left of its center line, the single toggle joint represented by the links 27, 76, moves from a position such as is shown in FIGURE 1, down to the extended position shown in FIGURE 3, and then back up into substantially the original position of FIGURE 1. In the meantime, under the urging of the gas motor and the movement of the links 26, 27, 76, the bell crank arms 24, 25, which are the launching arms, are violently driven down and forward as shown in FIGURES 1, 2 and 3. The downward motion of the arms 24, 25, carries with them the missile carriage 29, and serves to launch the missile which is released at the bottom of the travel in the manner hereinafter more fully set forth.

The travel of the piston 56 within the bore 55 is sharply slowed down as it approaches the end of the bore 55. This slowing action is accomplished by providing one or more openings 58 which connect the interior of the cylindrical bore 55 with the atmosphere. As the piston 56 passes the bore 58 the expanding gases within the cylinder 55 are exhausted through the bores 58 and the remaining travel of the piston is dependent upon the inertia of its original velocity. Nevertheless, this momentum is sufficient to drive the toggle joint 26 past its position of dead center and into the position shown in dashed lines in FIGURE 3, with the result that the launching arms 24, 25, are quickly and positively retracted to their original position.

From an examination of FIGURE 1 it will be seen that the links 27, 76, comprising the rear single toggle joint, in the armed position of the launcher, are disposed so that they lie beyond the center line of the said joint. In this position, the upper link 76 which is centrally carried upon the pivot pin 77 bears against a small stop 59 which is secured to the top of the housing 20. The stop 59 prevents the link 76 from rotating beyond the desired location and keeps the said link from bearing against the end of the piston rod 51. In this position, the links 27, 76, serve to lock the launching arms 24, 25, so that the missile cannot be launched accidentally. In order to launch the missile, therefor, it is necessary to rotate the links 27, 76, sufficiently from their locked position to free the launching arm. This rotation is accomplished by means of the initial motion of the piston 49 and its rod 51. As the gases enter the cylindrical bore 48, the rod 51 is brought to bear against the bearing surface 78 of link 76 and moves it in the direction of the arrow shown in FIGURE 2, until the upper link 76 and the two links 27 which are attached at each end of the pivot pin 77 and to the arm 25, are past their locked position. At this juncture, the piston 49 uncovers the port 53 to begin the main launching motion.

As the launch arms 24 swing down, driven by the force of the rod 57 transmitted through the toggle joint 26, they pivot about the stub shaft 60. The upper ends 61 of the bell crank lever shaped launching arms 24 swing rearwardly and drive the links 32 which interconnect the tops of the two sets of launching arms 24, 25. In this manner, the rear launching arms 25 are driven downwardly through the operation of the gas expansion motor 38.

It will be apparent, that the energy required to launch a missile of substantial size at speeds in the high supersonic is substantial. Employing a gas expansion motor to provide this energy without destroying the missile during the initial period of high peak forces requires a mechanism whereby the mechanical displacement is as great as possible while the average force applied is not excessive. In actual practice, the peak force on the piston of a gas expansion motor will be approximately fifty times the force at the end of the piston stroke and approximately thirty-five times the average piston force. Previously known devices used for launching have attempted to compensate for this characteristic by means of simple lever mechanisms. Such structures provide a mechanical ratio which cannot exceed approximately 5 to 1. However, such mechanical ratios are not adequate to prevent damage to the missile during launching. In the present invention a compound linkage mechanism is employed which will supply a mechanical linkage ratio variation almost exactly compatible to the piston force ratio so that the final output force is substantially constant or is an average force. This linkage is hereinafter referred to as an integrating linkage. The integrating linkage consists of the front and rear launch arms 24, 25, the toggle joints 26, 27, 76, the link 32 and the missile carriage 29.

In addition, the high initial peak force of the gas motor is further controlled by a large internal piston cavity 62, best shown in FIGURE 2 in dashed lines. The cavity 62 provides additional space for the gas to expand during the initial stages of the operation of the gas expansion motor 38. It will be understood, that the characteristics of a gas expansion motor as the source of energy is in direct conflict with the necessary force characteristics required to increase the vertical velocity of a store or missile from zero velocity to a possible velocity of 25 feet per second, necessary for successful separation at the minimum peak acceleration, or where the required force curve should vary as $V_2^2 - V_1^2$. The integrating linkage hereinabove described is so designed as to provide a variable leverage ratio such that when the piston force is at its greatest, the linkage ratio is at its lowest. At the end of the separation stroke the piston force approaches zero and the leverage ratio passes through infinity as the toggle links 26, 27, 76, approach a straight line. The result of this linkage creates a separation force versus displacement curve compatible with the required velocity versus force curve. Although the gas pressure behind the piston is low at the point where separation is complete, the linkage ratio is infinity. The result is a high peak separation force at the instant where it is most useful.

Despite the novel distribution of forces to the missile by the integrating linkage and the gas motor structure, it is also essential that this force be applied to the missile in a manner which will not destroy the delicate mechanism to be launched. During the launch the missile may be subjected to tremendous forces resulting from the passage of air over and under the wings of the aircraft. These forces may tend to transmit pitch roll and yaw forces and moments to the missile as it is being released. The missile must be held by the launcher and supported during this period in such a manner that these forces do not apply unequal stresses to the missile with a resulting destruction of the said missile.

In the present invention, therefor, the missile is held by a carriage 29, in the form of an elongated beam 63 having a somewhat arcuate bottom surface 64 which conforms generally to the configuration of the missile 65, as best shown in FIGURE 6. The force transmitted to the carriage 29 by the gas motor 38, and integrating linkage is further distributed over a large area of the missile 65 by means of elongated wedge shaped sway braces 66. The sway braces 66, best shown in FIGURES 3 and 6, are in the form of elongated rods having a wedge shaped cross section. The rods are bored at suitable intervals as indicated at 67 in FIGURE 6, to receive a plurality of screws 68, which are threadably received within the beam 63. The sway braces 66 are initially backed off to the position shown at the left of FIGURE 6. After the missile 65 has been engaged, in a manner hereinafter more fully set forth, the screws 68 are tightened until the sway braces 66 are brought into firm engagement with the surface of the missile 65. Since the braces 66 are flexible they are able to conform to the shape of the missile 65, which is generally not uniformly cylindrical.

During the launching operation and while the missile 65 is being thrust down and forward as the result of the motion of the front and rear launching arms 24, 25, the force of the launcher is distributed over the entire contact surface between the sway braces 66 and the surface of the missile 65 therebelow. This distribution of the launching forces over the extended surfaces of the sway braces prevents the said sway braces from piercing the thin skin of the missile. In addition, the elongated bearing surfaces provided by the sway braces hold the missile in proper launch position against the forces which are brought to bear against the surface of the missile during the period of launch and before it can be thrown clear of the shock waves, turbulence and other forces created by the passage of the aircraft through the air.

Prior art missile launching devices have often released the missile at the beginning of the launch operation. These devices have relied upon the downward thrust of the launching arms to keep the missile in engagement with the missile launching device. However, as flying speeds have increased and exceeded the sonic, it has been found that such devices are incapable of imparting the necessary control to the missile to assure proper performance and accuracy. In the present invention, the missile 65 is secured to the carriage 63 in such a manner that it will be released at the bottom of the launching motion and at the moment of greatest downward and forward velocity. Until released, the missile is locked solidly against the sway braces throughout most if not all of the travel of the carriage 29. The missile is thus mechanically controlled against rotation about any of its three axes during the launch operation. In addition, the release is accomplished independently of the mass or weight of the missile being released inasmuch as the missile or store is not used for the purpose of opening retaining hooks or the like. However, the present device provides the necessary large mechanical forces required to release the store or missile and positively and mechanically frees the missile at the optimum moment. Since the launching device herein described is useful in connection with a large variety of missiles or stores, there has been provided on the carriage 29 spaced openings 69, 70, to receive the suspension lugs 71, of the store or missile 65. The suspension lugs 71 may be ring-shaped as shown in FIGURE 6, or button-shaped in the form of a mushroom-like projection secured to the missile. In either event, the operation of the release mechanism in accordance with the present invention is the same.

A plate 72 is slidably carried upon the top of the carriage 29 as best shown in FIGURES 4 and 6. The plate 72 is provided with complimentary openings 73, 74 which permit the suspension lugs 71 to slip through the openings 69, 70 and to traverse the plate 72. It will be understood that the openings 69, 70, 73, 74, may be of a wide variety of shapes and spacing to accommodate more than a single type of missile or store.

In the case of suspension lugs 71, in the form of hooks, the plate 72 is provided with upstanding portions 75 having a somewhat parallelogram shape. The upstanding portions 75, hereinafter referred to as release wedges are located immediately adjacent the openings 73, 74, and extend into said openings as shown in FIGURE 4. When the plate 72 is slid to the left with respect to the carriage 29 the release wedges 75 will slip into the ring-like suspension lugs 71. If the plate 72 is slid to the right, it will be seen that the suspension lugs 71 are free and the missile 65 can fall away from the carriage 29. The operation of the release wedges serves to free the missile 65 completely and there is no requirement in the present structure whereby the motion of the missile is necessary to release it from the launcher. If the suspension lugs 71 are in the form of mushroom-like protuberances the plate 72 is provided with somewhat keyhole shaped openings (not shown) which, when slid away from the suspension lugs, completely release the missile or store 65.

The manner in which the plate 72 is slid into and out of engagement with the missile suspension lug 71, is more clearly shown in FIGURES 3 and 10. Each of the rear launch arms 25, is provided with an arcuate segment 79, at the outer end thereof. The arcuate segment 79 has a recess 80 therein and a cam surface 81 on the outer end thereof. A latch member 82 is rotatably carried between the arcuate segments 79 upon the roller 35A, which interconnects the rear launching arms 25. The latch member 82 is formed with an upstanding handle portion 83 and laterally disposed hook-shaped plates 84. A short link 85 is freely connected at one end to the latch member 82 as indicated at 86 and at its other end to an upstanding ear member 87 formed as an integral portion of the slidable plate 72. It will be apparent that as the latch member 82 is rotated about the roller 35A, in a clockwise direction as indicated in dashed lines in FIGURE 10, it will slide the plate 72 to the right. If the latch member 82 is rotated to the left it will urge the sliding plate 72 to the left. The handle 83 of the latch member is hollow and provided with a spring loaded plunger 88. The bottom of the plunger 88 is bored to receive a transverse pin 89. The transverse pin is adaptable to be slidably received within the radial recess 80 in the peripheray of the arcuate segments 79. The spring 90 within the handle 83 normally urges the pin 89 against the arcuate segment 79, and into the recess 80. However, when the plunger 88 is raised by lifting the knob 91 the pin 89 can be lifted out of the radial recess 80 and the latch member rotated in either a clockwise or counter-clockwise direction. As shown in FIGURE 10, the hook-like plates 84, overlie the lugs 71 of the missile 65, when the latch member 82 is in its normal or armed position and the pin 89 within the radial recess 80. The purpose of the hook-like members 84 is to prevent longitudinal motion of the missile or store 65 while it is being carried within the launching carriage.

It will be apparent from an examination of FIGURES 1, 3 and 10, that with the latch member 82 in the armed position, and swinging motion of the launching arms 25, as takes place during the launching operation will cause the link 85 to pull the sliding plate 72 to the right as indicated by the arrows in FIGURE 3. This motion of the sliding plate 72 withdraws the release wedges 75 from beneath the lugs 71 and brings the openings 69, 70, 73, 74, into register to release the missile 65.

The latch member 82 and its associated structure serves a further purpose in the present device in the operation of attaching a missile or store to the carriage of the launcher while the plane is on the ground. In this procedure, the carriage 29 is cranked down into a position immediately above the missile 65, by means hereinafter more fully set forth. If the carriage 29 is lowered sufficiently, it will be in the position shown in FIGURE 3, and the openings 69, 70, 73, 74, will be in registration ready to accept the lugs 71 of the missile 65. However, if the launcher is disposed on an aircraft which is built low to the ground the carriage 29 may only have to be lowered a short distance. Under such circumstances, the knob 91 can be raised and the pin 89 slipped out of the recess 80. The latch member 82 can then be swung to the right over the curved surface of the arcuate segments 79, until the openings 69, 70, 73, 74, are in registration or ready to accept the lugs 71. At this juncture the release wedges 75 will also be clear of the said openings. With the lugs 71 in place as indicated in dashed lines in FIGURE 3, the handle 83 can be swung about to the extreme left position past the recess 80 to slide the plate 72 to the left and bring the release wedges 75 beneath the lugs 71, to hold the missile firmly in place. The pin 89 will ride upon the surface of the arcuate segments 79, and come to rest somewhere between the recess 80 and the launching arm 25. The screws 68 on the elongated sway braces 66 can then be tightened to bring the sway braces into positive and uniform contact with the upper surface of the missile 65. Thereafter, the carriage and missile can be cranked upwardly to its armed position. As the carriage is raised the launching arms 24, 25, will move from the position shown in FIGURE 3 to that shown in FIGURE 1. The upward motion of the launching arms and the carriage 29 will also change the relationship of the latch member 82 with respect to the carriage 29. This change in relationship will cause the links 85 to force the latch member in a clockwise direction until the pin 89 snaps into the recesses 80. This operation is automatic and will bring about the latch member into its proper disposition for the armed phase of the launcher.

Figure 9:
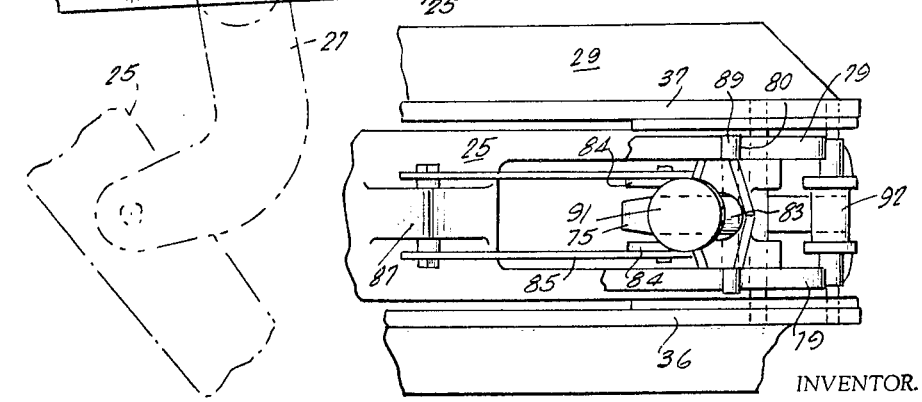
FIGURE 9 is a sectional view taken on line 9—9 in FIGURE 1, looking in the direction of the arrows.

It will be noted that the release wedges 75 are guided in their travel by the rollers 35, 92, at the end of the launching arms 24, 25. The rollers bear against the top of the release wedges 75 and aid in their smooth operation. The guide roller 92 is carried by the flanges 36, 37 of the carriages 29, at the extreme end thereof as shown in FIGURE 1. The guide roller 92 serve to hold the outermost release wedge down and keep the plate 72 against the carriage 29 (see FIGURE 9).

Figure 7:
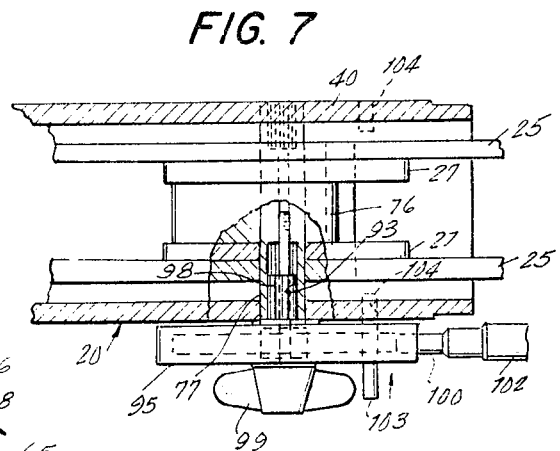
FIGURE 7 is a sectional view taken on line 7—7 in FIGURE 8, looking in the direction of the arrows.
Figure 8:
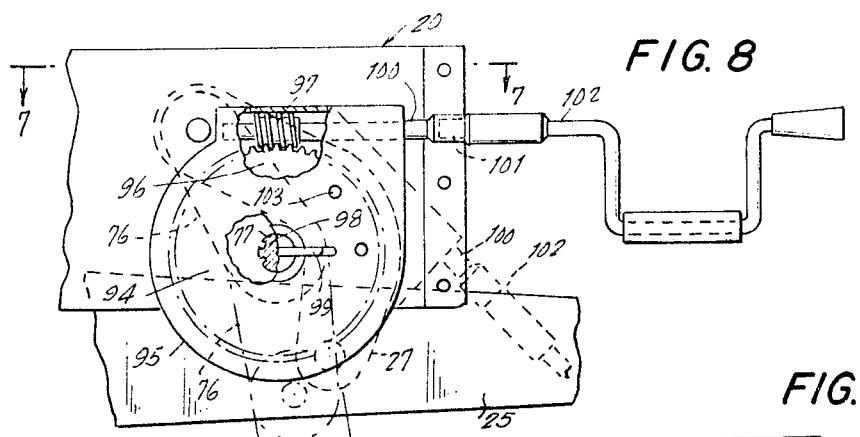
FIGURE 8 is a view in side elevation partly broken away of the manual carriage actuating mechanism.

As hereinabove set forth it is often necessary to bring the carriage 29 down into engagement with the missile or store 65 for loading purposes. This operation is required where the missile or store is of substantial size or weight and where there is not available adequate means for lifting the missile up to the launcher. The mechanism by means of which the carriage 29 is brought down into engagement with the missile 65, is best illustrated in FIGURES 7 and 8. It will be observed from an examination of FIGURES 2, 3, that the pivot pin 77 about which the rear links 27, 76, rotate is provided with an internally splined bore 93. An identical bore 93 is provided on each end of the pin 77 and, since the said pin extends through the link 76 and arms 25, the bore can be reached from either side of the launcher. A manual crank mechanism 94 can be coupled to the pivot pin 77 in the manner shown in FIGURES 7 and 8. The crank mechanism 94 consists of a housing 95 within which there is carried a worm wheel gear 96 driven by a worm 97. The gear 96 is secured to a shaft 98 which is externally splined to engage the internal splines of the bore 93. The manual crank mechanism 94 is further secured to the housing 20 of the launcher by means of a wing screw 99 which is threadably received within the pivot pin 77 as shown in FIGURE 7. The worm 97 is provided with an elongated shaft 100 at the end of which there is a socket 101 to receive a suitable tool such as the socket wrench 102 shown in FIGURES 7, 8. As the wrench 102 is turned the worm 97 is rotated thereby turning the gear 96 and the pivot pin 77.

When the pivot pin 77 rotates it carries with it the rear links 27, 76, which in turn rotate the rear launch arms 25, in a clockwise or counter-clockwise direction depending upon the direction of rotation of the pivot pin 77. The motion of the rear launch arms 25 is imparted to the front launch arms 24 by means of the interconnecting links 32. It will thus be seen that as the pivot pin 77 is rotated the launch arms 24, 25, will move to lower or raise the carriage 29. Since the pivot pin 77 is provided with a splined bore on each side thereof, the manual crank mechanism 94 can be operated from either side of the launcher for convenience in loading the missile or store.

In moving the manual crank mechanism 94 from one side of the launcher to the other, it is merely necessary to slip the pin 103, which traverses the housing 95 of the crank mechanism 94, into one of the bores 104 provided in the side wall 40 of the housing 20 for this purpose. More than one such bore 104 is provided so that the position of the socket 101 is convenient to the operator as indicated in FIGURE 8 in dashed lines.

From the foregoing the complete operation of the launcher made in accordance with the present invention will be apparent. The missile or store 65 is coupled to the carriage 29 by running the carriage 29 down into engagement with the missile 65 by means of the manual crank mechanism 94. The handle 83 of the latch member 82 is then swung in a counter-clockwise direction to slide the release wedges 75 beneath the missile lugs 71. Thereupon, the wrench 102 can be used to raise the launcher into its armed position as illustrated in FIGURE 1, at which juncture the pin 89 on the latch member 82 will snap into the recess 80 of the segment 79, ready for the firing operation. One or more cartridges 44 are slipped within the cavities 42 in the gas expansion motor 38 and connected to some remote control switch by electrical means (not shown) well known in the missile launching art. It will be understood that during the loading operation the sway braces 66 will be tightened in the manner hereinabove set forth to bring the sway braces into uniform contact with the missile along their entire lengths. The launcher is then ready for firing.

When the cartridges 44 are set off, as by means of the remote switch, the expanding gases of combustion pass through the bores in the motor block 41 and drive the pistons 28, 49, along their bores 55, 48. The piston 49 is first driven outwardly to unlock the rear links 27, 76, following which the expanding gases drive the piston 28 through its bore 55, to force the forward links of the double toggle joint 26 from the positions shown in FIGURES 1 and 2, into the position shown in FIGURE 3. The toggle links 26 which are pivotally secured at their upper end 105 to a bracket 106 carried by the top of the housing 20, drive the front and thus the rear launching arms into their launch position at which juncture the sliding plate 72 is moved to the right by reason of the links 85 and the latch member 82. As the piston 28 nears the end of its travel within the bore 55 the expanding gases are ported through openings 58, which substantially slow the travel of the piston. Nevertheless, the piston 28 still has sufficient momentum to drive the links 26 into the position shown in dashed lines in FIGURE 3, to thereby retract the carriage 63 and bring it into a position substantially that of FIGURE 1, or within the housing 20. It will be understood that before firing again the links 26 must be brought back to the position shown in FIGURE 1 so that the cycle can be repeated.

Since the present launcher is adapted for use on aircraft flying at speeds above the sonic it is necessary to control the disposition of the carriage 29 during launch with respect to the aircraft. In flights in excess of the sonic at extremely high altitudes, the aircraft must fly in a nose-up position with respect to the horizontal. To launch a missile from an aircraft in a nose-up position would be highly unsatisfactory inasmuch as the missile might tumble immediately following launching. In order to overcome this tendency the front launch arms 24 of the present device are provided with the length adjusting means shown in FIGURE 3. The length adjusting means consists of a short link 107 which is secured to the lower end of each launch arm 24 by bolts 108, slipped through one of several bores 109 provided in the launch arm 24. In this manner the length of the launch arm can be adjusted to compensate for the nose-up position of the aircraft during flight. An elongated slot 110 is provided in the flanges 36, 37, of the carriage 29, to compensate for the differences in launch arm length brought about by the adjustment link 107.

From the foregoing it will be seen that there has been provided a missile launching device capable of use on a wide variety of aircraft and under a wide variety of conditions. The launcher will maintain and control the missile throughout the launching operation in a manner which assures successful launching and which will protect the missile from damage due to the forces imposed by the launching operation. The launcher lends itself to easy loading and servicing and can be operated in a minimum amount of time.

Having thus fully described the invention, what is claimed as new and desired to be secured by Letters Patent of the United States, is:

1. A launcher for airborne stores and the like comprising a hollow housing, an integrated launching linkage swingably connected at one end to the housing, said linkage comprising spaced front launching arms, spaced rear launching arms, a front toggle joint swingably connected at one end to the housing and at its other end to the front launching arms, a rear toggle joint pivotally connected at one end to the housing and at its other end to the rear launching arms, and an elongated missile carriage member swingably secured to the outer free ends of each of the launching arms, a gas expansion motor carried by the housing and drivably coupled to at least one of the toggle joints whereby power is applied to the launching arms through the intermediate linkage of the toggle to drive the carriage downward and away from the housing and thereafter retract the said carriage in a continuous motion, and means carried by the carriage and at least one of the launching arms to release a store at substantially the end of the downward motion of the carriage.

2. A device according to claim 1 in which the front toggle joint is a double toggle joint and the rear toggle joint is a single toggle joint.

3. A device according to claim 1 in which the rear toggle joint is normally disposed in a position beyond its centerline to form a lock against downward carriage displacement and the motor is provided with a gas driven piston and rod responsive to the operation of the launcher to swing the rear toggle joint out of its locked position.

4. A device according to claim 1 in which the gas expansion motor is rockably carried within the housing and comprises a motor block, a first cylinder and a second cylinder, at least one cartridge receiving bore in the said block, a gas expansion chamber in the block, means to lead the expanding gas into the first and second cylinders, a piston and a piston rod in each cylinder, said first piston rod being disposed in the path of the rear toggle joint in the locked position and said second piston rod being drivably coupled to the front toggle joint.

5. A device according to claim 1 in which the gas expansion motor is rockably carried within the housing and comprises a motor block, a first cylinder and a second cylinder, at least one cartridge receiving bore in the said block, a gas expansion chamber in the block, means to lead the expanding gas into the first and second cylinders, a piston and a piston rod in each cylinder, said first piston rod being disposed in the path of the rear toggle joint in the locked position and said second piston rod being drivably coupled to the front toggle joint, a port in the first cylinder normally covered by the first piston whereby gas entering the first cylinder cannot enter the second cylinder until the first piston and rod has moved sufficiently to release the rear toggle joint.

6. A device according to claim 1 in which the gas expansion motor is rockably carried within the housing and comprises a motor block, a first cylinder and a second cylinder, at least one cartridge receiving bore in the said block, a gas expansion chamber in the block, means to lead the expanding gas into the first and second cylinders, a piston and a piston rod in each cylinder, said first piston rod being disposed in the path of the rear toggle joint in the locked position and said second piston rod being drivably coupled to the front toggle joint, a port in the first cylinder normally covered by the first piston whereby gas entering the first cylinder cannot enter the second cylinder until the first piston and rod has moved sufficiently to release the rear toggle joint, and an elongated cavity in the second piston and rod to receive the expanding gas.

7. A launcher for airborne stores and the like comprising a hollow housing, and integrated launching linkage swingably connected at one end to the housing, said linkage comprising spaced bell crank lever shaped front launching arms, spaced bell crank lever shaped rear launching arms, said arms being pivotally carried at their apices by the housing, a front toggle joint swingably connected at one end to the housing and at its other end to the front launching arms, a rear toggle joint pivotally connected at one end to the housing and at its other end to the rear launching arms, a link interconnecting the inner free ends of the front and rear launching arms, and an elongated missile carriage member swingably secured to the outer free ends of each of the launching arms, a gas expansion motor carried by the housing and drivably coupled to at least one of the toggle joints whereby power is applied to the launching arms through the intermediate linkage of the toggle to drive the carriage downward and away from the housing and thereafter retract the said carriage in a continuous motion, and means carried by the carriage and at least one of the launching arms to release a store at substantially the end of the downward motion of the carriage.

8. A launcher for airborne stores and the like comprising a hollow housing, an integrated launching linkage swingably connected at one end to the housing, said linkage comprising spaced front launching arms, spaced rear launching arms, a front toggle joint swingably connected at one end to the housing and at its other end to the front launching arms, a rear toggle joint pivotally connected at one end to the housing and at its other end to the rear launching arms, and an elongated missile carriage member swingably secured to the outer free ends of each of the launching arms, a gas expansion motor carried by the housing and drivably coupled to at least one of the toggle joints whereby power is applied to the launching arms through the intermediate linkage of the toggle to drive the carriage downward and away from the housing and thereafter retract the said carriage in a continuous motion and means to regulate the length of one pair of launch arms with respect to the other pair of launch arms whereby the store will be launched with a horizontal orientation.

9. A device according to claim 8 in which the length regulating means comprises a link between the launch arm and the carriage, an elongated slot in the said carriage, an elongated slot in the said carriage, means to secure the link to the launch arm and means to couple the free end of the link to the carriage slot.

10. A launcher for airborne stores and the like comprising a hollow housing, an integrated launching linkage swingably connected at one end to the housing, said linkage comprising spaced front launching arms, spaced rear launching arms, a front toggle joint swingably connected at one end to the housing and at its other end to the front launching arms, a rear toggle joint pivotally connected at one end to the housing and at its other end to the rear launching arms, and an elongated missile carriage member swingably secured to the outer free ends of each of the launching arms comprising an elongated carriage having spaced openings therein, an elongated plate having spaced openings therein in register with the carriage openings, said plate being slidably secured to the upper surface of the carriage and means to shift the plate with respect to the carriage to change the registration of said openings, a gas expansion motor carried by the housing and drivably coupled to at least one of the toggle joints to drive the carriage downward and away from the housing, and means including the plate shifting means carried by the carriage and at least one of the launching arms to release a store at substantially the end of the downward motion of the carriage.

11. A device according to claim 10 in which the plate shifting means comprises an arcuate segment on two of the spaced launching arms, a recess in the periphery of said segment, a latch member rotatably carried between the arcuate segments, means carried by the latch member to ride upon the periphery of the segments and enter the recesses and a link coupled at one end to the latch member and at its other end to the sliding plate.

References Cited by the Examiner

UNITED STATES PATENTS

| | | | |
|---|---|---|---|
| 2,386,839 | 10/1945 | Bronson | 89—1.5 |
| 2,921,501 | 1/1960 | Parot | 89—1.5 |
| 3,008,376 | 11/1961 | Brunow et al. | 89—1.5 |
| 3,056,623 | 10/1962 | Herbert | 294—83 |

BENJAMIN A. BORCHELT, *Primary Examiner.*

SAMUEL W. ENGLE, *Examiner.*